United States Patent [19]
Shimizu

[11] Patent Number: 5,935,250
[45] Date of Patent: Aug. 10, 1999

[54] DATA PROCESS APPARATUS AND METHOD

[75] Inventor: Yasushi Shimizu, Yokohama, Japan

[73] Assignee: Canon Kabushiki Kaisha, Tokyo, Japan

[21] Appl. No.: 08/833,030

[22] Filed: Apr. 3, 1997

[30] Foreign Application Priority Data

Apr. 4, 1996 [JP] Japan ................................ 8-106435

[51] Int. Cl.⁶ .................................................. G06F 13/00
[52] U.S. Cl. ................................ 713/201; 395/200.02
[58] Field of Search ......................... 395/187.01, 200.06,
395/200.01, 600, 229, 256.8, 427, 700,
621, 610, 650, 726, 741, 200.02; 364/283.3,
285, 282.4, 246.5; 713/201, 200, 202; 714/4,
12, 18, 20, 27

[56] References Cited

U.S. PATENT DOCUMENTS

| | | | |
|---|---|---|---|
| 5,495,614 | 2/1996 | Brent et al. | 395/700 |
| 5,550,976 | 8/1996 | Henderson et al. | 395/200.06 |
| 5,555,388 | 9/1996 | Shaughnessy | 395/427 |
| 5,630,072 | 5/1997 | Dobbins | 399/222 |
| 5,644,766 | 7/1997 | Coy et al. | 395/620 |
| 5,659,746 | 8/1997 | Bankert et al. | 395/621 |
| 5,692,178 | 11/1997 | Shaughnessy | 395/608 |
| 5,696,900 | 12/1997 | Nishigaya et al. | 395/200.01 |

*Primary Examiner*—Robert W. Beausoliel, Jr.
*Assistant Examiner*—Nadeem Iqbal
*Attorney, Agent, or Firm*—Morgan & Finnegan, LLP

[57] ABSTRACT

There is provided a data process apparatus comprises user ID (identification) storage means for storing a user ID which represents a user, a movement information storage means for storing information representing movement of the user, an input means for inputting data to be sent to the user corresponding to the user ID stored in the user ID storage means and transfer means for transferring the data input by the input means, on the basis of the information stored in the movement information storage means. Accordingly, in a case where the user changes the using data process apparatus (pre-change data process apparatus), the user utilize the changed data process apparatus (post-change data process apparatus) in the same manner as for the pre-change data process apparatus, only by a simple operation for changing registration of such the user.

26 Claims, 6 Drawing Sheets

FIG. 3

| USER NAME | A |
|---|---|
| USER ID | |
| USER SETTING INFORMATION | IMAGE OUTPUT FORMAT, PERSONAL TEL DIRECTORY, ... |
| CHANGE FLAG | |
| POST-CHANGE TEL NO. | TEL NO. OF FAX 111 |
| POST-CHANGE NETWORK ADDRESS | NETWORK ADDRESS OF COPY 110 |
| POST-CHANGE USER NAME | |
| POST-CHANGE USER ID | |

FIG. 6

USER ID INFORMATION

PRE-CHANGE IMAGE INPUT/OUTPUT APPARATUS INFORMATION (PRE-CHANGE TEL NO. : FAX 108)

(PRE-CHANGE NETWORK ADDRESS : COPY 107)

FIG. 7

POST-CHANGE TEL NO. : FAX 111

POST-CHANGE NETWORK ADDRESS : COPY 110

POST-CHANGE USER NAME

POST-CHANGE USER ID

DATA PROCESS APPARATUS AND METHOD

BACKGROUND OF THE INVENTION

1. Field of the Invention

The present invention relates to a data process apparatus which performs a data process on image data or the like. More particularly, the present invention relates to the data process apparatus which can be correlated with users who use the apparatus, and a data process method in which such the data process apparatus is utilized.

2. Related Background Art

In recent years, as network environment becomes full, a plurality of data process apparatuses each having a facsimile function or the like are connected on a network and thus information or the like generated from these data process apparatuses are common to a plurality of users.

In this case, the data process apparatus frequently used by the users has been previously registered as it has been correlated with, e.g., a user ID (identification) or the like, and thus data to be transferred to the user having the correlated user ID is automatically transferred thereto. Further, various information (e.g., telephone directory or the like for destination inputting) to be used in case of operating the data process apparatus have been previously stored as they have been correlated with the user ID, and then the information is read and processed by inputting the user ID. Therefore, convenience in the data process apparatus common to the plurality of the users can be improved.

However, e.g., in a case where the user changed his working position in such the network as the numerous data process apparatuses are connected to, the data process apparatus which is ordinarily used by such the user is also changed. In this case, e.g., if such the user wishes to obtain a reception image which has been received in facsimile reception by the data process apparatus which is not yet changed (to be referred as pre-change data process apparatus hereinafter), there is a problem that the user must go to a position at which the pre-change data process apparatus is located to obtain the reception image. Alternatively, there is a problem that the user must request, by using a telephone or the like, an another user who is working near the pre-change data process apparatus to transfer such the reception image to the data process apparatus which has been already changed (to be referred as post-change data process apparatus hereinafter).

Further, in the case where the data process apparatus is changed, information representing use environment (e.g., an abbreviated telephone number directory of facsimile transmission destination) which is personally set and used by the user in the pre-change data process apparatus can not be used. Therefore, in such the case, there is a problem that the user must again set such the use environment for the post-change data process apparatus.

SUMMARY OF THE INVENTION

An object of the present invention is to provide data process apparatus and method which can eliminate the above-described problems.

An another object of the present invention is to provide the data process apparatus and method which can easily cope with a case where a user changed the data process apparatus used by him.

Still another object of the present invention is to provide the data process apparatus and method which can easily change setting data stored in such the data process apparatus.

Still another object of the present invention is to easily change the data process apparatus for use by the user.

Still another object of the present invention is to provide the data process apparatus and method which can appropriately set the setting data.

The above and other objects of the present invention will become apparent from the following detailed description when read in conjunction with the accompanying drawings.

BRIEF DESCRIPTION OF THE DRAWINGS

FIG. 3 is a view for explaining an example of a format of user ID (identification) information.

FIG. 6 is a view for explaining an example of information stored in an ID card.

FIG. 7 is a view for explaining an example of a format of user ID information change request information to be transmitted.

DETAILED DESCRIPTION OF THE PREFERRED EMBODIMENTS

Hereinafter, the embodiments of the present invention will be explained in detail with reference to the accompanying drawings.

First Embodiment

Initially, the first embodiment of the present invention will be explained with reference to FIGS. 1, 2, 3 and 4.

Figure 1:
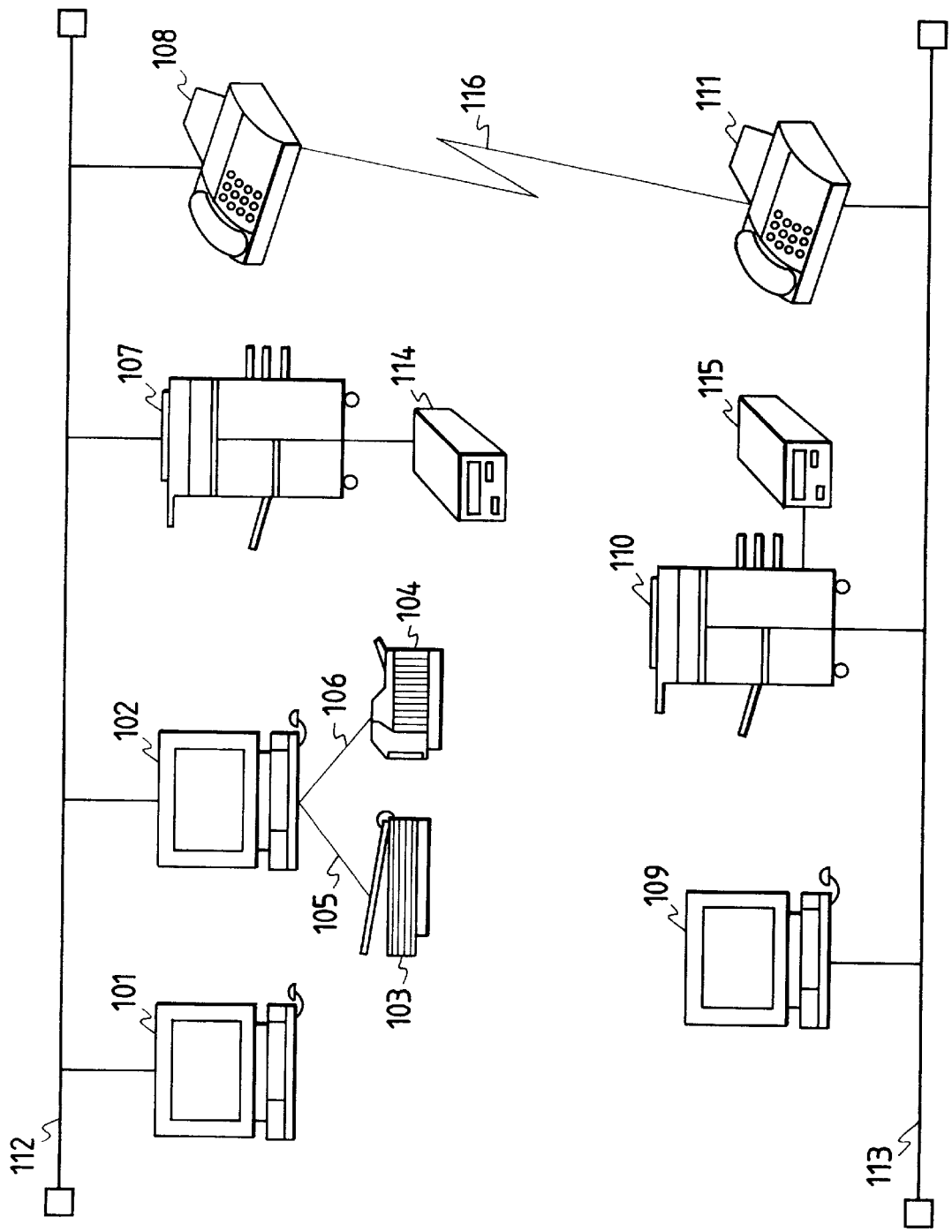
FIG. 1 is a block diagram showing the structure of an image input/output system to which an image input/output apparatus according to a first embodiment of the present invention is connected.

FIG. 1 is a block diagram showing the structure of an image input/output system to which a plurality of apparatuses to be common to a plurality of users are connected. In the present embodiment, it will be explained the image input/output system which is structured by connecting two independent networks to each other with one public line.

In FIG. 1, a LAN (local area network) 112 which is one of the two independent networks is connected with personal computers (to be referred as PC hereinafter) 101 and 102 used by the user, a copy machine 107 having an original copying function or the like, and a facsimile apparatus 108 having a facsimile function or the like.

The PC 101 is used by the user to form a document, to perform transmission and reception of an electronic mail to and from an another computer, or the like.

The PC 102 is used by the user in the same manner as for the PC 101. The PC 102 is connected to a scanner unit 103 for reading image data of an original and a printer unit 104 for printing the image data, via a built-in general interface (not shown). Via a line 105, the image data which has been read by the scanner unit 103 is edited or processed based on an application software installed in the PC 102, and then the edited image data is added onto the formed document. Further, via a line 106, the printer unit 104 is used to output or print the document formed by the PC 102. A system which is composed of the PC 102, the scanner unit 103 and the printer unit 104 constructs a simple copy machine. Such the simple copy machine outputs or prints the image data read by the scanner unit 103 in response to an operation from the PC 102, by using the printer unit 104.

The copy machine 107 has a large-size liquid crystal touch panel. Also, the copy machine 107 acts as image input/output apparatus which has a scanner function for reading the image data on the original, and a printer function for outputting or printing the image data. Further, the copy machine 107 itself has the copying function independently. In addition, by connecting an optomagnetic disk unit 114, the copy machine 107 acts as electronic filing apparatus for storing the image data as a file.

Moreover, the copy machine 107 acts as printer for visibly outputting the data supplied from the computer or the like which is connected to the copy machine 107 directly or via the network. That is, the copy machine 107 receives via the LAN 112 image formation command data (to be used for forming the image) for the document or the like which has been formed by the PC 101, PC 102 or the like, develops the received data into bit-map image data, and then outputs or prints the obtained image data.

The facsimile apparatus 108 which has a large-size liquid crystal touch panel (not shown) is connected to the LAN 112 and also connected to a public line 116 such as a PSTN (public switched telephone network) or the like. The facsimile apparatus 108 independently has a simple facsimile function and a facsimile transmission/reception function. Also, the facsimile apparatus 108 acts as gateway unit to an another LAN 113 via the public line 116. As the LANs 112 and 113, e.g., an Eternet or the like is used.

The another LAN 113 which is different from the LAN 112 is connected with a PC 109 structured in the same manner as for the PC 101, a copy machine 110 structured in the same manner as for the copy machine 107, and a facsimile apparatus 111 structured in the same manner as for the facsimile apparatus 108. Further, an optomagnetic disk 115 is connected to the copy machine 110. Furthermore, via the public line 116, the facsimile apparatus 111 is connected to the facsimile apparatus 108 which is connected to the LAN 112.

Figure 2:
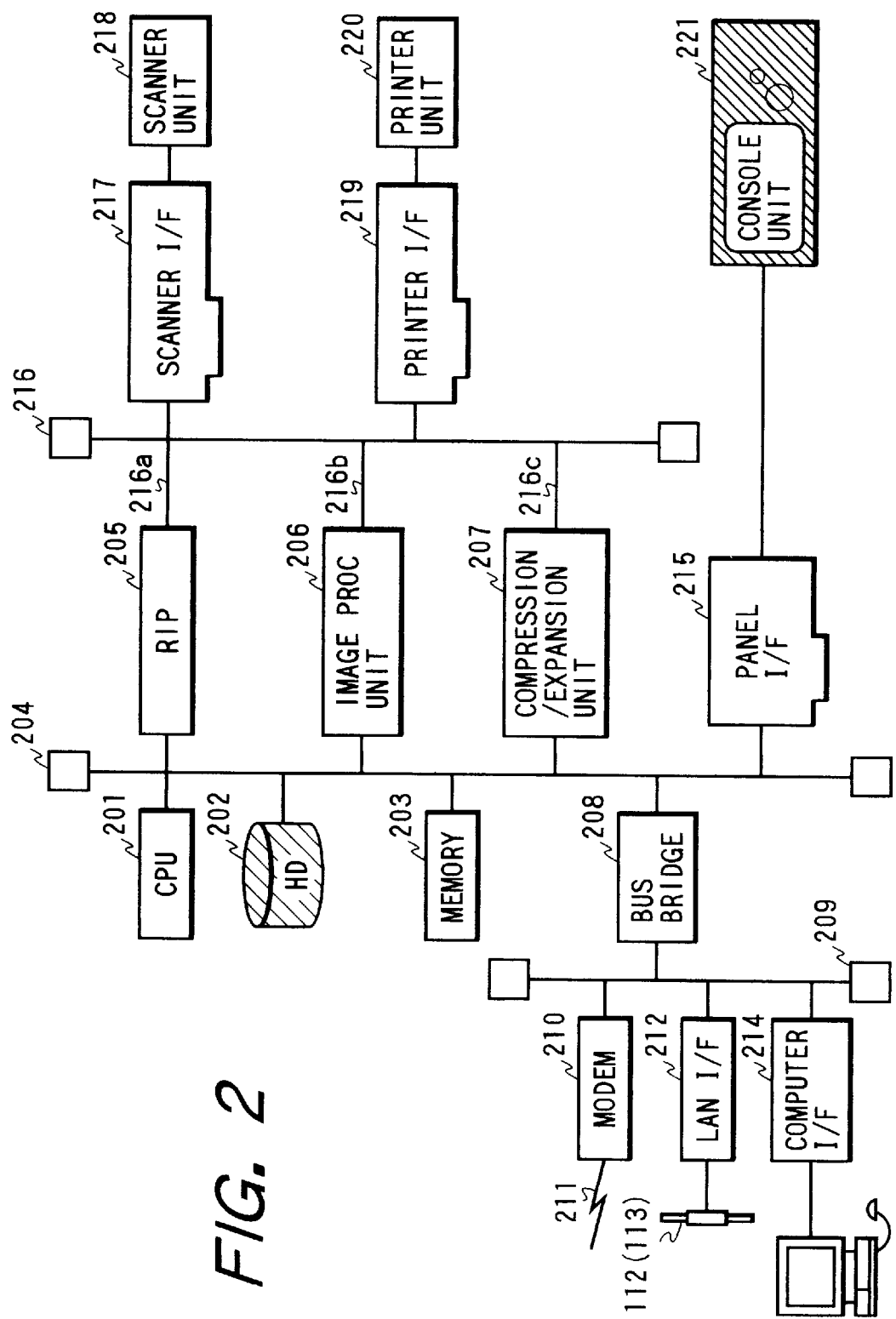
FIG. 2 is a block diagram showing the structure of a main portion which is common in a scanner, a printer, a copy machine and a facsimile apparatus shown in FIG. 1.

FIG. 2 is a block diagram showing the structure of a main portion which is common to the image input/output apparatus shown in FIG. 1, i.e., composed of the scanner unit 103, the printer unit 104, the copy machine 107, the facsimile apparatus 108, the copy machine 110 and the facsimile apparatus 111.

In FIG. 2, a CPU (central processing unit) 201, an HD (hard disk) 202, a memory 203, an RIP (raster image processor) 205, an image process unit 206, a compression/expansion unit 207 and a panel interface 215 are connected to others via a high-speed CPU bus 204. Further, the RIP 205, the image process unit 206 and the compression/expansion unit 207 are connected to a scanner interface 217 and a printer interface 219, via high-speed image bus 216, respectively.

The panel interface 215 is connected to a console unit 221 which acts as input means, the scanner interface 217 is connected to a scanner unit 218 which has the scanner function of the image input/output apparatus, and the printer interface 219 is connected to a printer unit 220 which has the printer function of the image input/output apparatus. The high-speed CPU bus 204 is connected to a low-speed CPU 209 via a bus bridge 208. A modem 210, a LAN (local area network) interface 212 and a computer interface 214 are connected with others via the low-speed CPU bus 209.

The CPU 201 acts as microprocessor for controlling the image input/output apparatus, and is operated on the basis of a real-time OS (operating system).

The HD 202 acts as large-capacity hard disk for storing a plurality of application programs to be used for operating the CPU 201.

The memory 203 acts as working memory which is used when the CPU 201 operates, and can be accessed from the CPU 201 at high speed. Further, the memory 203 constructs a storage means which stores user ID information having a later-described format.

The high-speed CPU 204 acts as bus which is used for transferring data processed by the CPU 201 to the HD 202, the memory 203, the RIP 205, the image process unit 206 or the compression/expansion unit 207, and for directly transferring data among these components (i.e., performing DMA (direct memory access) transfer).

The RIP 205 forms the image data consisting of a bit map in accordance with the contents of the image formation command data. The image formation command data is input from the computer (i.e., PC 101, PC 102 or the like) externally connected to the image input/output apparatus, via the computer interface 214, the low-speed CPU bus 209, the bus bridge 208 and the high-speed CPU bus 204. That is, the image formation command data acts as command data for instructing to form the image data consisting of the bit map. The RIP 205 interprets a general page description language to perform the processes such as a raster image data formation process and the like. The image data formed by the RIP 205 is output to the high-speed image bus 216 (described later).

In accordance with a processing instruction or order from the CPU 201, the image process unit 206 performs a filtering process such as a smoothing process, an edge process or the like, on the image data which has been input from the high-speed image bus 216. Further, the image process unit 206 has an OCR (optical character recognition) function for the image data input from the high-speed image bus 216, an image separation function for separating a character portion and an image (or photograph) portion from each other, and the like.

The compression/expansion unit 207 performs a process for compressing the image data input from the high-speed image bus 216 in an image compression method such as an MH (modified Huffman) method, an MR (modified READ) method, an MMR (modified modified READ) method or a JPEG (joint photograph expert group) method, and then transferring the compression data to the high-speed CPU bus 204 or the high-speed image bus 216. Further, the compression/expansion unit 207 performs a process for expanding compression image data input from the high-speed CPU bus 204 or the high-speed image bus 216 in the same method as that used in compressing such the compression image data, and then transferring the expansion data to the high-speed image bus 216.

The bus bridge 208 acts as bus bridge controller for absorbing a difference in processing speed between the high-speed CPU bus 204 and the low-speed CPU bus 209. By providing the bus bridge 208 between the buses 204 and 209, the CPU 201 which operates at high speed can access the modem 210, the LAN interface 212 or the computer interface 214 which is connected to the low-speed CPU bus 209 and thus operates at low speed.

The low-speed CPU bus 209 has the bus structure of which transferring speed is lower than that of the above-described high-speed CPU bus 204, and is connected with the structural components of which processing speed are relatively low.

The modem 210 has a function for modulating digital image data transferred from the low-speed CPU bus 209 such that the obtained digital image data has a format capable of being transferred to a public line 211. Further, the modem 210 has a function for converting modulation image data transferred from the public line 211 into the digital image data capable of being processed in the image input/output apparatus.

The LAN interface 212 connects the image input/output apparatus to the local area network, i.e., the above-described LAN 112 or 113, and is used to transmit and receive (i.e., exchange) the data between the apparatus and the local area network.

The computer interface 214 inputs and outputs a control command transferred from the computer to which the image input/output apparatus is connected. Further, the computer interface 214 inputs and outputs status of the image input/output apparatus to be returned to the computer. Generally, RS-232C interface for performing serial communication or Centronics interface for performing parallel communication is used as the computer interface 214.

The high-speed image bus 216 includes image data input/output buses 216a, 216b and 216c which are respectively connected to the RIP 205, the image process unit 206 and the compression/expansion unit 207. The RIP 205, the image process unit 206, the compression/expansion unit 207, the scanner interface 217 and the printer interface 219 are connected to others via the high-speed image bus 216. The high-speed image bus 216 is not controlled by the CPU 201 but is controlled by a bus controller (not shown).

The scanner interface 217 performs optimal binarization on the image data which has been read by the scanner unit 218, in accordance with subsequent processes. Also, the scanner interface 217 performs serial-to-parallel conversion corresponding to data width of the high-speed image bus 216, and performs data conversion on read RGB (red, green and blue) trichromatic color data to generate CMYBk (cyan, magenta, yellow and black) color data. Then, the scanner interface 217 transfers the obtained color image data to the high-speed image bus 216.

The scanner unit 218 acts as visible image reader having an automatic original feeding mechanism, and has an RGB three-line CCD (charge coupled device) color sensor or a one-line black and white CCD line sensor. The image data which has been read by the scanner unit 218 is transferred to the high-speed image bus 216 via the scanner interface 217.

The printer interface 219 transfers the image data from the high-speed image bus 216 to the printer unit 220. Further, the printer interface 219 has a bus width conversion function for converting a bus width of the high-speed image bus 216 into a bus width corresponding to a gradation of the printer unit 220, and a function for absorbing a difference between printing speed of the printer unit 220 and image data transferring speed of the high-speed image bus 216.

The printer unit 220 outputs or prints the image data received from the printer interface 219, onto a recording paper or sheet as a visible image. As the printer unit 220, a bubble-jet printer which performs the printing on the recording paper by using a bubble-jet system, a laser beam printer which utilizes electrophotographic technique for forming the image on a photosensitive drum by forming the image on the recording paper with laser beam, or the like can be used. Further, as the laser beam printer, a monochromatic laser beam printer and a CMYBk color laser beam printer can be used.

The panel interface 215 transfers or receives various control signals between the console unit 221 and the CPU 201. Further, the panel interface 215 transfers a signal which has been input from a hard key or the like provided on the console unit 221 to the CPU 201, or performs resolution conversion which is necessary in displaying the image data generated by the RIP 205, the image process unit 206 and the compression/expansion unit 207 on a liquid crystal display unit of the console unit 221.

The console unit 221 has the liquid crystal display unit, a touch panel input unit attached onto the liquid crystal display unit, and the plurality of the hard keys. A signal which has been input from the touch panel input unit or the hard key is transferred to the CPU 201 via the panel interface 215 and the high-speed CPU bus 204. The liquid crystal display unit displays the image data transferred from the panel interface 215 and the various functions in the operation of the image input/output apparatus.

FIG. 3 is a view for explaining an example of a format of user ID (identification) information which is used in a later-described process.

In FIG. 3, user ID information is composed of a user name, a user ID for discriminating such the user, user setting information representing the setting of the image input/output apparatus by such the user, a change flag for displaying whether or not the image input/output apparatus to be used by such the user has been changed, a telephone number of a gateway unit of the LAN to which the image input/output apparatus which has been changed (to be referred as post-change image input/output apparatus hereinafter) is connected, a network address of the post-change input/output apparatus in the LAN to which such the post-change image input/output apparatus is connected, a user name of the post-change image input/output apparatus, and a user ID for discriminating such the user of the post-change image input/output apparatus. The user ID information is stored in the memory 203 in each image input/output apparatus.

In this case, the user setting information is information which can be set independently in a case where each user utilizes the image input/output apparatus. The user setting information includes, e.g., indication of an image output format, a personal telephone directory for destination selection to be used in case of using the facsimile function, and the like. When the user uses the image input/output apparatus, the user setting information can be appropriately rewritten in accordance with its setting state and its using state. Further, the contents of the user ID information can be changed from the computer (e.g., PC 101, PC 102, PC 109 or the like shown in FIG. 1) which is used by a manager of the LAN 112 or 113 to which such the image input/output apparatus is connected, or from the console unit 221 of each image input/output apparatus. Furthermore, the user setting information can be called by inputting the user ID and thus can be appropriately utilized.

In the above structure, in a case where the user changes the image input/output apparatus (being correlated with such user) which is ordinarily used by him, the user ID information of the user of the input/output apparatus which has been used prior to such change (to be referred as pre-change image input/output apparatus hereinafter) and the user ID information of the user of the post-change image input/output apparatus are changed respectively. The change of the user ID information according to the change of the image input/output apparatus used by such the user is performed by editing the user ID information of the pre-change image input/output apparatus and the post-change image input/output apparatus after the user is newly registered in the post-change image input/output apparatus as the user of such the post-change image input/output apparatus. In this case, such editing is performed by the computer 101, 102 or 103 on the network 112 to which the copy machine 107 acting as the pre-change image input/output apparatus or the network 113 to which the copy machine 110 acting as the post-change image input/output apparatus, and a result of such the editing is transferred to the copy machines 107 and 110 via the LANs 112 and 113 and the public line 116.

For example, in a case where the user changed the image input/output apparatus to be used, from the copy machine 107 connected to the LAN 112 to the copy machine 110 connected to the LAN 113, initially the name of such the user is newly registered as the user name of the user ID information stored in the memory 203 of the copy machine 110. Then, in order to set the contents of the registered new user ID information such that they become the same as those of the user ID information in the copy machine 107 acting as the pre-change image input/output apparatus, the user ID information is transferred from the copy machine 107 to the copy machine 110 via the LANs 112, 113 and the public network 116. Each information included in the transferred user ID information is registered in the copy machine 110 as the user ID information. In this case, only the user setting information may be transferred from the copy machine 107 to the copy machine 110. After the transferring of the user ID information to the copy machine 110 terminated, the change flag of the transferred user ID information is turned on, the telephone number of the facsimile apparatus 111 on the LAN 113 is registered as a post-change telephone number, the address of the copy machine 110 on the LAN 113 is registered as a post-change network address, and the user ID information including the user name and the user ID registered by the copy machine 110 as a post-change user name and a post-change user ID is stored in the memory 203 of the copy machine 107.

Figure 4:
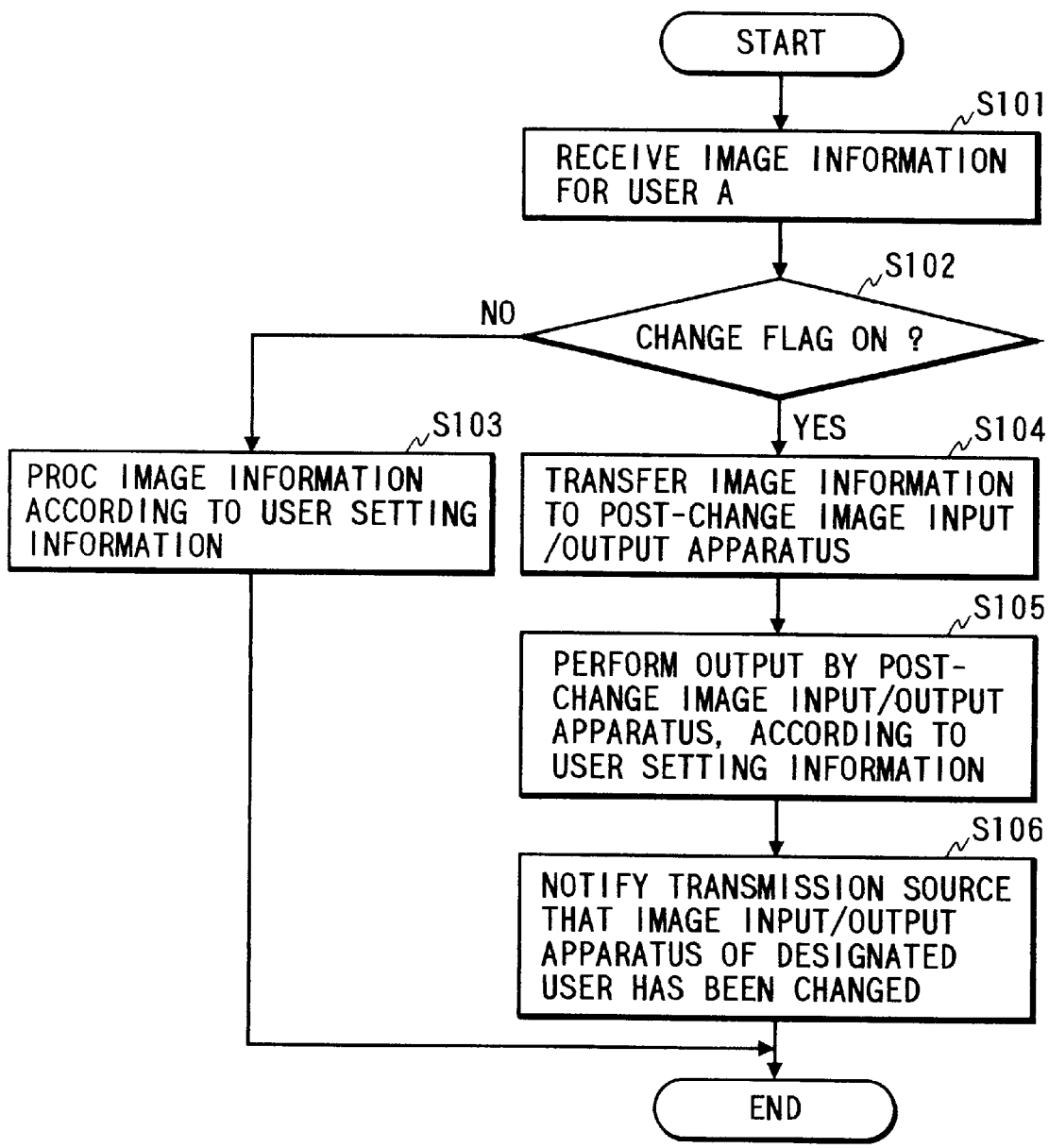
FIG. 4 is a flow chart showing a facsimile reception procedure which is performed in the image input/output system shown in FIG. 1.

FIG. 4 is a flow chart showing a facsimile reception procedure which is performed or executed in the image input/output system shown in FIG. 1. In this case, it will be explained hereinafter a case where the image data has been transmitted via a public line 116 to the user who uses the copy machine 107, from a facsimile apparatus (not shown) other than the image input/output system shown in FIG. 1.

In case of transmitting the image data to the copy machine 107, the facsimile apparatus other than such the image input/output system performs call generation on the basis of the telephone number of the facsimile apparatus 108 on the LAN 112 to which the copy machine 107 is connected, and then establishes call connection between such the facsimile apparatus and the facsimile apparatus 108. After then, in accordance with known facsimile transmission procedure, such the facsimile apparatus other than the image input/output system designates the network address of the copy machine 107 and the destination user name (i.e., such destination is performed in NSS (non-standard facilities set-up) system when obeying T.30 of ITU-T (International Telecommunication Union—T)), and performs the facsimile transmission.

In a case where the facsimile apparatus 108 received the image date which has been transmitted via the public line 116, such the image data is transferred to the copy machine 107 together with the information representing the destination user name on the basis of the network address which has been received together with the image data.

If the copy machine 107 receives such the transferred image data (step S101), the copy machine 107 refers to the change flag included in the user ID information corresponding to the user name which has been designated as the destination, so as to judge whether or not the image input/output apparatus to be used by such the user has been changed from the copy machine 107 to the another image input/output apparatus (step S102).

Such judgement whether or not the image input/output apparatus to be used by the user has been changed from the copy machine 107 to the another image input/output apparatus is performed on the basis of whether or not the change flag included in the user ID information stored in the memory 203 has been turned on. If it is judged that the image input/output apparatus has not been changed (i.e., "NO" in step S102), an image data process is performed in accordance with the user setting information corresponding to such the user name (step S103). As the user setting information in the copy machine 107, e.g., it has been set an output condition as to whether the image data is output (or printed) as it is by using the printer unit 220 in the copy machine 107, whether the image data is transferred to the optomagnetic disk unit 104 to be subjected to electronic filing, or whether the image data is subjected to the electronic filing and also output by using the printer unit 220 in the copy machine 107. In the step S103, the process is performed in accordance with such the contents of the user setting information.

On the other hand, if it is judged that the image input/output apparatus has been changed (i.e., "YES" in step S102), the image data is transferred to the post-change image input/output apparatus by referring to the post-change telephone number and the post-change network address both included in the user ID information (step S104).

Concretely, the post-change telephone number (i.e., telephone number of facsimile apparatus 111) and the post-change network address (i.e., network address of copy machine 110) are obtained from the user ID information stored in the memory of the copy machine 107, and the obtained telephone number and the network address are transferred to the facsimile apparatus 108 together with the image data. After receiving the image data, the post-change telephone number and the post-change network address, the facsimile apparatus 108 connects the call to the facsimile apparatus 111 by performing the call generation based on the post-change telephone number, to transmit the image data and the post-change network address to the facsimile apparatus 111. Then, the facsimile apparatus 111 transfers the image data to the copy machine 110 by referring to the received post-change network address together with the image data.

The image data which has been transferred to the copy machine 110 is processed in accordance with the contents of the user setting information stored in the memory of such the copy machine 110 (step S105). Further, in a case where the user setting information of such user has not been set in the copy machine 110, the user setting information as well as the image data is transmitted to the facsimile apparatus 111, and the image data is caused to be processed in accordance with such the user setting information.

In a case where the image input/output apparatus which is to be used by the user and has been designated from a transmission side has been changed, such the transmission side (i.e., transmission side) is notified about that the image input/output apparatus of such the designated user has been changed (step S106). Concretely, the information which represents the previous user ID, the new user ID, the previous telephone number, the new telephone number and the like is transferred from the copy machine 107 to the facsimile apparatus 108, and further transmitted to the image data transmission source.

In this case, if at least the telephone number has been notified, the image data comes to be input to the LAN to which the image input/output apparatus used by the user is connected, whereby a transferring cost by utilizing the public line can be reduced in subsequent transferring.

After the process in the step S103 or S106 terminated, the facsimile reception procedure terminates.

As explained above, according to the first embodiment of the present invention, in the image input/output system to which the plurality of the image input/output apparatuses are connected, when the user changes the using image input/output apparatus which is correlated with such the user, the user ID information in the pre-change image input/output apparatus is transferred from the pre-change image input/output apparatus to the post-change image input/output apparatus, and the transferred user ID information can be registered as the user ID information of such the user in the post-change image input/output apparatus. Therefore, only by performing the simple change registration operation, the user can use the post-change image input/output apparatus in the same manner as for the pre-change image input/output apparatus.

Further, in the case where the image data is transmitted to the pre-change image input/output apparatus at which the user had already changed the using image input/output apparatus, such the transmitted image data is transferred from such the pre-change image input/output apparatus to the post-change image input/output apparatus which is being used by such the user, and also such the transferred image data can be processed based on the same setting as in the pre-change image input/output apparatus. Therefore, even if the user changes the image input/output apparatus to be used, he can use the post-change image input/output apparatus in the same manner as in the pre-change image input/output apparatus.

Furthermore, the transmission-source apparatus which has transmitted the image data to the pre-change image input/output apparatus is notified about that the image input/output apparatus to be used by the designated user has been already changed. Therefore, the user at the transmission source can recognize or know that the user at the transmission destination has been moved or has changed his location, and thus the image data can be transmitted directly to the post-change image input/output apparatus which is being used by the transmission-destination user.

Second Embodiment

Hereinafter, the second embodiment of the present invention will be explained with reference to FIGS. 5 to 7. In the second embodiment, each user who uses an image input/output apparatus has own ID (identification) card. Therefore, when the user changes the image input/output apparatus to be used, also such the ID card is used.

Figure 5:
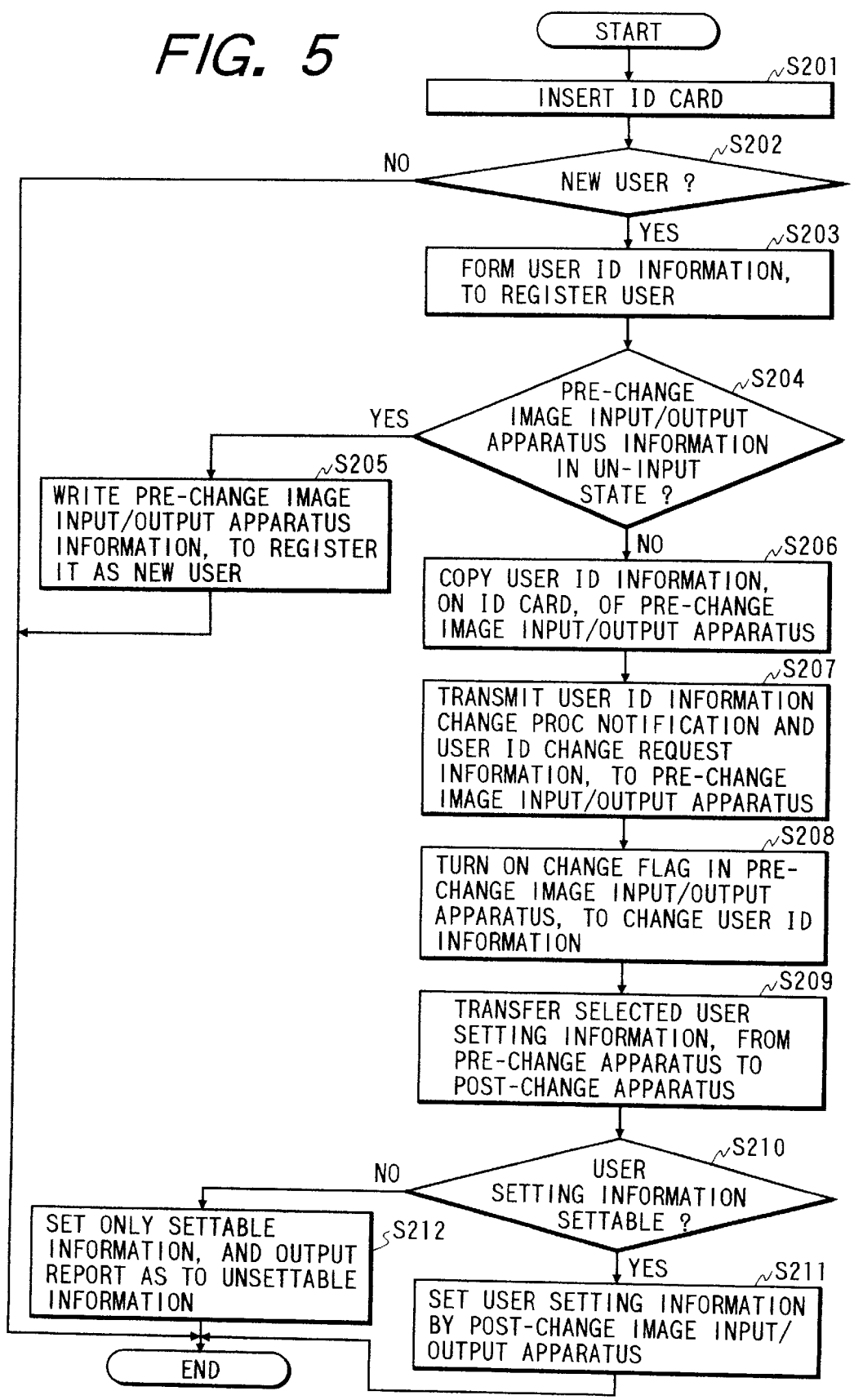
FIG. 5 is a flow chart showing, in an image input/output system to which an image input/output apparatus according to a second embodiment of the present invention is connected, a change process procedure of such the image input/output apparatus which is used by a user.

FIG. 5 is a flow chart showing a changing process procedure in an image input/output system to which the image input/output apparatus according to the second embodiment is connected. In the changing process procedure, the image input/output apparatus which is to be used by the user and correlated with such the user is changed. Like the above-described first embodiment, it will be explained a case where the user changes the using image input/output apparatus from a copy machine 107 connected to a LAN (local area network) 112 to a copy machine 110 connected to a LAN 113. In this case, each image input/output apparatus connected to the image input/output system has an insertion hole into which the ID card of the user is inserted and a card reader for reading the contents of the inserted ID card, in order to specify the user who is using such the image input/output apparatus.

FIG. 6 shows the contents of information recorded on the ID card. In a recording portion on the ID card, user ID information and pre-change image input/output apparatus information have been recorded. The user ID information has been stored in a memory 114 of the copy machine 107 acting as pre-change image input/output apparatus which was used by the user having such the ID card. Further, the pre-change image input/output apparatus information is composed of a pre-change telephone number and a pre-change network address. In the second embodiment, a telephone number of a facsimile apparatus 108 on the LAN 112 to which the copy machine 107 is connected is recorded as the pre-change telephone number, and a network address on the LAN 112 to which the copy machine 107 is connected is recorded as the pre-change network address.

The user ID information and the pre-change image input/output apparatus information have been recorded on the ID card when the user was registered as a new user of the copy machine 107. User setting information which is included in the user ID information stored in the image input/output apparatus and in the user ID information recorded on the recording portion of the ID card can be appropriately rewritten in case of actually using the image input/output apparatus.

In case of changing the using image input/output apparatus, initially, the ID card is inserted into the insertion hole of the copy machine 110 acting as post-change image input/output apparatus, by the user (step S201). Then, the copy machine 110 urges or requests the user to input a password. When the password is input by the user on the basis of such an urge or request, the use ID information and the pre-change image input/output apparatus information both recorded on the inserted ID card are fetched or obtained. At that time, by referring to either one of or both a user name and a user ID included in the fetched user ID information, it is judged whether or not such the user who inserted the ID card is the new user (step S202). In this case, such judgement is performed by checking whether or not the fetched user ID information corresponding to the user name and the user ID has been previously registered in the memory of own apparatus.

If yes in the step S202, i.e., if it is judged that the user who inserted the ID card is the new user, the user ID information is generated so as to register such the user as the new user in the copy machine 110 (step S203). The user ID information generated in the step S203 is completely new information, and thus any information other than the user name and the user ID is not yet input.

Subsequently, it is judged whether or not the contents of the pre-change image input/output apparatus information fetched in the step S202 are in an un-input state (step S204). If yes in the step S204, it can be judged that such the user is not the user of which registration has been changed from the another image input/output apparatus but is completely the new user. Therefore, a telephone number of a facsimile apparatus 111 acting as gateway unit on the LAN 113 and a network address of the copy apparatus 110 are recorded on the recording portion of the ID card, as the pre-change image input/output apparatus information (step S205).

On the other hand, if no in the step S204, the user ID information fetched in the step S202 is copied to the user ID information generated in the step S203 (step S206). After such copying, the telephone number of facsimile apparatus 111 on the LAN 113 and the network address of the copy machine 110 are recorded on the recording portion of the ID card as the pre-change image input/output apparatus information.

After the process in the step S206 terminated, user ID information change request information is transmitted together with a user ID information change termination notification, from the copy machine 110 to the copy machine 107 (step S207). The user ID information change request information includes the telephone number of the facsimile apparatus 111, the network address of the copy machine 110, the new user name and the new user ID. FIG. 7 shows an example of a format of the user ID information change request information to be transmitted to the copy machine 107.

In a case where the copy machine 107 (i.e., pre-change image input/output apparatus) receives the user ID information change termination notification and the user ID information change request information, a change flag of the user ID information stored in the memory of the copy machine 107 is turned on in accordance with the received user ID information change request information, the telephone number of the facsimile apparatus 111 is registered as a post-change telephone number, and the network address of the copy machine 110 is registered as a post-change network address (step S208).

Further, user setting information (e.g., output format of image data, telephone directory for destination selection and the like) other than the user ID information which has been stored in the memory of the copy machine 107 (i.e., pre-change image input/output apparatus) and selected by the user is transferred to the copy machine 110 (i.e., post-change image input/output apparatus) (step S209).

In the copy machine 110, it is judged whether or not the transferred user setting information can be actually set (step S210). That is, it can be supposed that the copy machine 110 is being set not to store the transferred user setting information, the copy machine 110 does not have any function to perform the process based on the transferred user setting information, there is no preparation to perform the process based on the transferred user setting information, or the like. In such case, a negative result (i.e., "no") is obtained in the step S210, and then the flow advances to a step S212.

On the other hand, if yes in the step S210, the flow advances to a step S211 to store and set the transferred user setting information in the memory of the copy machine 111.

In the step S212, only the user setting information which can be set in the copy machine 111 is set. However, with regard to the another user setting information which can not be set in the copy machine 111, a printer unit 220 prints a report which representing the contents of such the another user setting information and also the fact that such the another user setting information can not be set.

The changing process procedure terminates in the case where there is "no" in the step S202, the registration of the user ID information terminates in the step S205, or the process in the step S211 or S212 terminates.

After the image input/output apparatus to be used in the image input/output system has been changed in such the procedure as described above, e.g., in a case where the image data is transmitted to the copy machine 107 from an outside of the image input/output system via a public line 116, such the transmitted image data is further transferred to the copy machine 110 (i.e., post-change image input/output apparatus) by utilizing the post-charge telephone number and the post-change network address both included in the user ID information stored in the memory of the copy machine 107. The transferred image data is then processed in accordance with the user setting information stored in the memory 203 of the copy machine 110. In this case, such the user setting information has been set in the console unit 221 of the copy machine 111 or transferred from the copy machine 107.

As explained above, according to the second embodiment, each user has the own ID card, and the user ID information and the pre-change image input/output apparatus information have been stored in such the ID card. Therefore, the user can utilize the post-change image input/output apparatus in the same manner as for the pre-change image input/output apparatus, by simply inserting the ID card into the post-change image input/output apparatus.

Further, in the case where the image input/output apparatus to be used by the user has been changed, the pre-change image input/output apparatus is notified that the image input/output apparatus has been changed. Therefore, after changing the image input/output apparatus to be used, there is no need to register the change of user in the pre-change image input/output apparatus, or the like. Furthermore, even if the image information is received by the pre-change image input/output apparatus after the using image input/output apparatus has been changed, such the received image information can be transferred to the post-change image input/output apparatus which is currently used by the user.

In the second embodiment, the image input/output apparatus is changed by using the ID card. Also, even in a case where the user who wishes to change the using image input/output apparatus manually inputs the information recorded on the ID card by using the console unit 221 of the post-change image input/output apparatus, of course, the same effect as described above can be obtained. In this case, the processes subsequent to the inputting of the information recorded on the ID card by using the console unit 221 are the same as those in the step S202 and subsequent steps in the flow chart shown in FIG. 5.

Further, in a case where it has not been previously set by the manager of the copy machine 110 that the registration can be changed by using the ID card, the image input/output apparatus can be structured such that the above-described changing by using the ID card can not be performed.

Furthermore, the flow charts shown in FIGS. 4 and 5 represent the flow of the control which is performed or executed on the basis of a program code stored in an HD (hard disk) 202 and read by the CPU 201 of each apparatus in the image input/output system shown in FIG. 1. Such the flow should be grasped in the system as a whole, and thus can be realized by appropriately performing the communication among the apparatuses or devices in the entire system.

Furthermore, the second embodiment is inherent in each user. However, of course, the present embodiment may be applied in each group which is composed of the plurality of users.

The present invention can be applied to a system constructed by a plurality of equipments (e.g., host computer, interface equipment, reader, printer and the like) or can be also applied to an apparatus comprising a single equipment (e.g., copy machine, facsimile machine).

The invention employed by a method whereby program codes of a software to realize the functions of the foregoing embodiments are supplied to a computer in an apparatus or a system connected to various devices so as to make the devices operative in order to realize the functions of the foregoing embodiments and the various devices are operated in accordance with the programs stored in the computer (CPU or MPU) of the system or apparatus is also included in the scope of the present invention.

In such a case, the program codes themselves of the software realize the functions of the foregoing embodiments and the program codes themselves and means for supplying the program codes to the computer, e.g., a memory medium in which the program codes have been stored construct the present invention.

As such a memory medium to store the program codes, e.g., it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible with the spirit and scope of the appended claims.

What is claimed is:

1. A data process apparatus comprising:
   user ID (identification) storage means for storing a user ID which represents a user;
   movement information storage means for storing information representing movement of the user;
   reception means for receiving data to be sent to the user corresponding to the user ID stored in said user ID storage means;
   transfer means for transferring the data received by said reception means, on the basis of the information stored in said movement information storage means; and
   notification means for notifying a transmitter who transmitted the data received by said reception means of information representing that the user has moved.

2. An apparatus according to claim 1, wherein the information stored in said movement information storage means includes information representing a destination of a gateway unit of a network to which a data process apparatus used by the user after the movement.

3. An apparatus according to claim 1, further comprising discrimination means for discriminating whether or not the user has moved, and
   wherein said transfer means transfers the data in response to the discrimination by said discrimination means.

4. A data process apparatus comprising:
   input means for inputting a plurality of setting information which has been set in another apparatus, in correspondence with a user ID (identification) representing a user;
   setting means for setting each of the plurality of setting information input by said input means;
   judgment means for judging whether or not each of the plurality of setting information input by said input means can be set by said setting means; and
   control means for controlling said setting means to set the setting information which said judgment means judged to be capable of setting, among the plurality of setting information input by said input means, and for outputting information for discriminating the setting information which said judgment means judged to be impossible to set.

5. An apparatus according to claim 4, wherein the setting information set by said setting means is information which is available by inputting the corresponding user ID.

6. A data process apparatus comprising:
   storage means for storing user information which includes setting information concerning using environment of said data process apparatus, in correspondence with a user;
   transfer means for transferring, in a case where said data process apparatus to be used by the user has been changed to an another data process apparatus, the stored setting information to said another data process apparatus;
   image information reception means for receiving image information; and
   change notification means for notifying a transmission source of the image information received by said image information reception means, about that said data process apparatus to be used by the user has been changed.

7. An apparatus according to claim 6, wherein the user information includes user change information representing a change of said data process apparatus to be used by the user, and
   further comprising input means for inputting address information of said another data process apparatus, as the user change information.

8. An apparatus according to claim 6, wherein the setting information includes information concerning an output format of image information in said data process apparatus.

9. An apparatus according to claim 6, wherein the setting information includes a telephone number of a transmission destination.

10. An apparatus according to claim 6, further comprising:
    image information transmission means for transmitting, in a case where the image information to the user is received by said image information reception means after said data process apparatus to be used by the user has been changed to said another data process apparatus, the received image information to said another data process apparatus, on the basis of user change information included in the user information.

11. A data process apparatus comprising:
    input means for inputting user information which includes user change information concerning a change of said data process apparatus to be used by a user and setting information concerning using environment of said data process apparatus set by the user;
    storage means for storing, in a case where it has been judged based on the input user information that the user is a new user, the input user information in correspondence with the user; and
    notification means for notifying an another data process apparatus which had been used by the user before the user uses said data process apparatus, about that said data process apparatus to be used by the user has been changed, on the basis of the stored user change information.

12. An apparatus according to claim 11, wherein said input means is structured such that the user information is input by inserting with the user an ID (identification) card on which the user information has been recorded.

13. An apparatus according to claim 11, further comprising card recording means for recording the user information into an ID card.

14. A data process apparatus comprising:

storage means for storing user information which includes user change information concerning a change of said data process apparatus to be used by a user and setting information concerning using environment of said data process apparatus set by the user, wherein, in a case where it has been received from an another data process apparatus a notification representing that said data process apparatus to be used by the user has been changed to said another data process apparatus, said storage means stores address information of said another data process apparatus as the user change information;

image information reception means for receiving image information; and change notification means for notifying said data process apparatus which is a transmission source of the image information received by said image information reception means, about that said data process apparatus to be used by the user has been changed.

15. An apparatus according to claim 14, further comprising:

image information transmission means for transmitting, in a case where the image information to the user has been received by said image information reception means after said data process apparatus to be used by the user had been changed to said another data process apparatus, the received image information to said another data process apparatus, on the basis of the user change information.

16. An apparatus according to claim 14, further comprising card recording means for recording the user information into an ID (identification) card.

17. A computer readable program, stored in a storage medium, which, when executed, performs the steps comprising:

a user ID (identification) storage step of storing a user ID which represents a user, into a storage device;

a movement information storage step of storing information representing movement of the user, into the storage device;

a reception step of receiving data to be sent to the user corresponding to the user ID stored in said user ID storage step;

a transfer step of transferring the data received in said reception step, on the basis of the information stored in said movement information storage step; and a notification step of notifying a transmitter who transmitted the data received in said reception step of information representing that the user has moved.

18. A computer readable program, stored in a storage medium, which, when executed, performs the steps comprising:

an input step of inputting a plurality of setting information which has been set in another apparatus, in correspondence with a user ID (identification) representing a user;

a setting step of setting each of the plurality of setting information input in said input step;

a judgment step of judging whether or not each of the plurality of setting information input in said input step can be set in said setting step; and a control step of controlling said setting step to set the setting information which said judgment step judged to be capable of setting, among the plurality of setting information input in said input step and of outputting information for discriminating the setting information which said judgment step judged to be impossible to set.

19. A computer readable program, stored in a storage medium, which, when executed, performs the steps comprising:

a storage step of storing user information which includes setting information concerning using environment of a data process apparatus, in correspondence with a user;

a transfer step of transferring, in a case where the data process apparatus to be used by the user has been changed to an another data process apparatus, the stored setting information to the another data process apparatus;

a reception step of receiving image information; and a notification step of notifying a transmission source of the image information received in said reception step, about that said data process apparatus to be used by the user has been changed.

20. A computer readable program, stored in a storage medium, which, when executed, performs the steps comprising:

an input step of inputting user information which includes user change information concerning a change of a data process apparatus to be used by a user and setting information concerning using environment of the data process apparatus set by the user;

a storage step of storing, in a case where it has been judged based on the input user information that the user is a new user, the input user information into a storage device in correspondence with the user; and a notification step of notifying an another data process apparatus which had been used by the user before the user uses the data process apparatus, that the data process apparatus to be used by the user has been changed, on the basis of the stored user change information.

21. A computer readable program, stored in a storage medium, which, when executed, performs the steps comprising:

a storage step of storing user information which includes user change information concerning a change of a data process apparatus to be used by a user and setting information concerning using environment of the data process apparatus set by the user, into a storage device;

a control step of performing control such that, in a case where it has been received from an another data process apparatus a notification representing that the data process apparatus to be used by the user has been changed to the another data apparatus, address information of the another data process apparatus is stored in the storage device as the user change information;

a reception step of receiving image information; and a notification step of notifying said data process apparatus which is a transmission source of the image information received in said reception step, about that said data process apparatus to be used by the user has been changed.

22. A method comprising:

a user ID (identification) storage step of storing a user ID which represents a user, into a storage device;

a movement information storage step of storing information representing movement of the user, into the storage device;

a reception step of receiving data to be sent to the user corresponding to the user ID stored in said user ID storage step;

a transfer step of transferring the data received in said reception step, on the basis of the information stored in said movement information storage step; and a notification step of notifying a transmitter who transmitted the data received in said reception step of information representing that the user has moved.

23. A method comprising:

an input step of inputting a plurality of setting information which has been set in another apparatus, in correspondence with a user ID (identification) representing a user;

a setting step of setting each of the plurality of setting information input in said input step to a data process apparatus;

a judgment step of judging whether or not each of the plurality of setting information input in said input step can be set in said setting step; and a control step of controlling said setting step to set the setting information which said judgment step judged to be capable of setting, among the plurality of setting information input in said input step and of outputting information for discriminating the setting information which said judgment step judged to be impossible to set.

24. A method comprising:

a storage step of storing user information which includes setting information concerning using environment of a data process apparatus, in correspondence with a user;

a transfer step of transferring, in a case where the data process apparatus to be used by the user has been changed to another data process apparatus, the stored setting information to the another data process apparatus;

a reception step of receiving image information; and a notification step of notifying a transmission source of the image information received in said reception step, about that said data process apparatus to be used by the user has been changed.

25. A method comprising:

an input step of inputting user information which includes user change information concerning a change of a data process apparatus to be used by a user and setting information concerning using environment of said data process apparatus set by the user;

a storage step of storing, in a case where it has been judged based on the input user information that the user is a new user, the input user information in correspondence with the user; and a notification step of notifying another data process apparatus which had been used by the user before the user uses said data process apparatus, about that said data process apparatus to be used by the user has been changed, on the basis of the stored user change information.

26. A method comprising:

a storage step of storing user information which includes user change information concerning a change of a data process apparatus to be used by a user and setting information concerning using environment of the data process apparatus set by the user, into a storage device;

a control step of performing control such that, in a case where it has been received from an another data process apparatus a notification representing that the data process apparatus to be used by the user has been changed to the another data apparatus, address information of the another data process apparatus is stored in the storage device as the user change information;

a reception step of receiving image information; and a notification step of notifying said data process apparatus which is a transmission source of the image information received in said reception step, about that said data process apparatus to be used by the user has been changed.

* * * * *